US008966651B2

(12) United States Patent
McConnell et al.

(10) Patent No.: US 8,966,651 B2
(45) Date of Patent: *Feb. 24, 2015

(54) DIGITAL RIGHTS MANAGEMENT (DRM) LOCKER

(71) Applicant: Intel Corporation, Santa Clara, CA (US)

(72) Inventors: Christopher J. McConnell, Gilbert, AZ (US); Uday R. Savagaonkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/204,924

(22) Filed: Mar. 11, 2014

(65) Prior Publication Data
US 2014/0196155 A1 Jul. 10, 2014

Related U.S. Application Data

(63) Continuation of application No. 13/566,223, filed on Aug. 3, 2012, now Pat. No. 8,707,450.

(51) Int. Cl.
G06F 7/04 (2006.01)
H04L 9/08 (2006.01)
H04L 29/06 (2006.01)
G06F 21/10 (2013.01)
G06F 11/30 (2006.01)
G06F 12/14 (2006.01)
H04L 9/00 (2006.01)

(52) U.S. Cl.
CPC ............... *H04L 63/10* (2013.01); *G06F 21/10* (2013.01); *H04L 2463/101* (2013.01)
USPC ............. 726/27; 380/201; 380/277; 380/278; 380/281; 380/286; 713/189

(58) Field of Classification Search
CPC ... G06F 21/10; G06F 21/00; H04L 2209/603; H04L 63/10; H04L 2463/101
See application file for complete search history.

(56) References Cited

U.S. PATENT DOCUMENTS

| 7,356,147 | B2 | 4/2008 | Foster et al. |
| 8,230,518 | B2 | 7/2012 | de Jong |
| 8,370,216 | B2 | 2/2013 | Kessel et al. |
| 2007/0198426 | A1 | 8/2007 | Yates |
| 2008/0147530 | A1 | 6/2008 | Kwan et al. |
| 2008/0148414 | A1* | 6/2008 | Tom ................................ 726/29 |
| 2008/0162170 | A1* | 7/2008 | Kumar et al. ..................... 705/1 |
| 2008/0288784 | A1* | 11/2008 | Lee et al. ........................ 713/189 |
| 2009/0164794 | A1 | 6/2009 | Verosub et al. |
| 2009/0193254 | A1* | 7/2009 | Sweazey ........................ 713/175 |
| 2009/0210698 | A1* | 8/2009 | Candelore ..................... 713/153 |
| 2009/0276635 | A1 | 11/2009 | Baggen et al. |

(Continued)

*Primary Examiner* — Dede Zecher
*Assistant Examiner* — Trang Doan
(74) *Attorney, Agent, or Firm* — Schwabe, Williamson & Wyatt, P.C.

(57) ABSTRACT

Methods, apparatuses and storage medium associated digital rights management (DRM) using DRM locker is disclosed herein. In embodiments, a DRM locker is provided to a client device. The DRM locker may be configured to store a number of DRM licenses or keys for a number of DRM protected contents. The DRM locker, on presentation of an associated locker key, may respond to a request for one or more of the stored DRM licenses or keys, to enable consumption of the corresponding DRM protected contents using the client device. Other embodiments may be disclosed or claimed.

13 Claims, 7 Drawing Sheets

(56) References Cited

U.S. PATENT DOCUMENTS

| | | | |
|---|---|---|---|
| 2010/0031033 A1* | 2/2010 | Kim et al. | 713/163 |
| 2011/0040967 A1 | 2/2011 | Waller et al. | |
| 2011/0225417 A1 | 9/2011 | Maharajh et al. | |
| 2011/0246774 A1 | 10/2011 | Phillips et al. | |
| 2012/0239758 A1 | 9/2012 | Dzmitrenka et al. | |
| 2012/0311655 A1 | 12/2012 | Hohlfeld et al. | |

* cited by examiner

Non-transitory computer-readable storage medium
702

Programming Instructions 704
configured to cause a device, in response to execution of the programming instructions, to practice (aspects of) embodiments of the methods of Figures 2-5.

Figure 7

DIGITAL RIGHTS MANAGEMENT (DRM) LOCKER

RELATED APPLICATION

This application is a continuation of U.S. patent application Ser. No. 13/566,223, entitled "Digital Rights Management (DRM) Locker," filed on Aug. 3, 2012, and claims priority to the Ser. No. 13/566,223 application. The specification of the Ser. No. 13/566,223 application is hereby fully incorporated by reference.

TECHNICAL FIELD

This application relates to the technical field of data processing, more specifically to methods, apparatuses and storage medium associated digital rights management through usage of digital rights management (DRM) lockers.

TECHNICAL FIELD

The background description provided herein is for the purpose of generally presenting the context of the disclosure. Unless otherwise indicated herein, the materials described in this section are not prior art to the claims in this application and are not admitted to be prior art by inclusion in this section.

Traditionally, DRM is configured to protect content for the benefit of the content provider. DRM is employed to prevent the content from being copied, altered, or used by unauthorized parties. A content provider typically sets up DRM servers and requires the consumers validate their licenses with these servers every time an access to a purchased content is needed. Each DRM scheme, often unique to a content provider, controls how the content distributed by the content provider is consumed and who is able to consume it, protecting the rights of the content provider and enforcing the rules defined by the content provider.

The consumers of purchased contents must abide by these rules defined by the content owners due to the various DRM schemes employed. Specific content consumption programs equipped to support particular DRM schemes must be used, and there could be restrictions on what kind of devices are allowed to consume the content. Consumers that want to consume the content using methods that differ from what a content provider intended may be prevented to do so by the DRM scheme employed. A possible use case would be to consume the content when Internet connectivity is not available. Consumers that live within the boundaries that the content provider specifies, are free to use the content as long as the content provider retains the infrastructure to support the DRM scheme.

If a content provider has Internet connectivity issues, turns off the DRM servers, or stops being a content provider; the consumer can lose access to the purchased content from the particular content provider. Content providers have discontinued support of DRM servers in the past where consumers were advised to burn their music to audio CDs before the shutdown or lose access to the purchased contents. For musical contents, the burning of an audio CD removes the DRM from the music, and the consumer can import the music into their devices without regard for the DRM protocol established by the content provider. The problem with this process is that the music is often converted from one compressed format to another compressed format, which frequently reduces the quality of the music. It also allows the consumer to start using the content in ways the content provider did not intend. The content creators that licensed the contents to the content provider could lose further sales due to the removal of the DRM which they expected to be retained on the contents.

Thus, the consumer is the party that is highly impacted by content providers' DRM schemes, and is at risk of losing access to purchased content for various reasons.

BRIEF DESCRIPTION OF THE DRAWINGS

Embodiments of the present invention will be described by way of exemplary embodiments, but not limitations, illustrated in the accompanying drawings in which like references denote similar elements, and in which:

FIG. 7 illustrates an example non-transitory computer-readable storage medium having instructions configured to practice all or selected aspects of the operational flows of FIGS. 2-5; all arranged in accordance with embodiments of the present disclosure.

DETAILED DESCRIPTION

Methods, apparatuses and storage medium associated with digital rights management through usage of DRM lockers is disclosed herein. In embodiments, DRM lockers may be provided by a DRM locker vendor, which may be separate and/or independent of content providers. A DRM locker provided to a client device may be configured to locally store DRM licenses or keys of various DRM protected contents of different content providers. The DRM licenses or keys may be of different license or key types. The employment of a DRM locker may enable a user of the client device to be able to continue to enjoy and consume the DRM protected contents even when the DRM license or key servers of the content providers are no longer accessible or available. Other benefits and advantages may also be described and/or apparent to those skilled in art from the description to follow.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
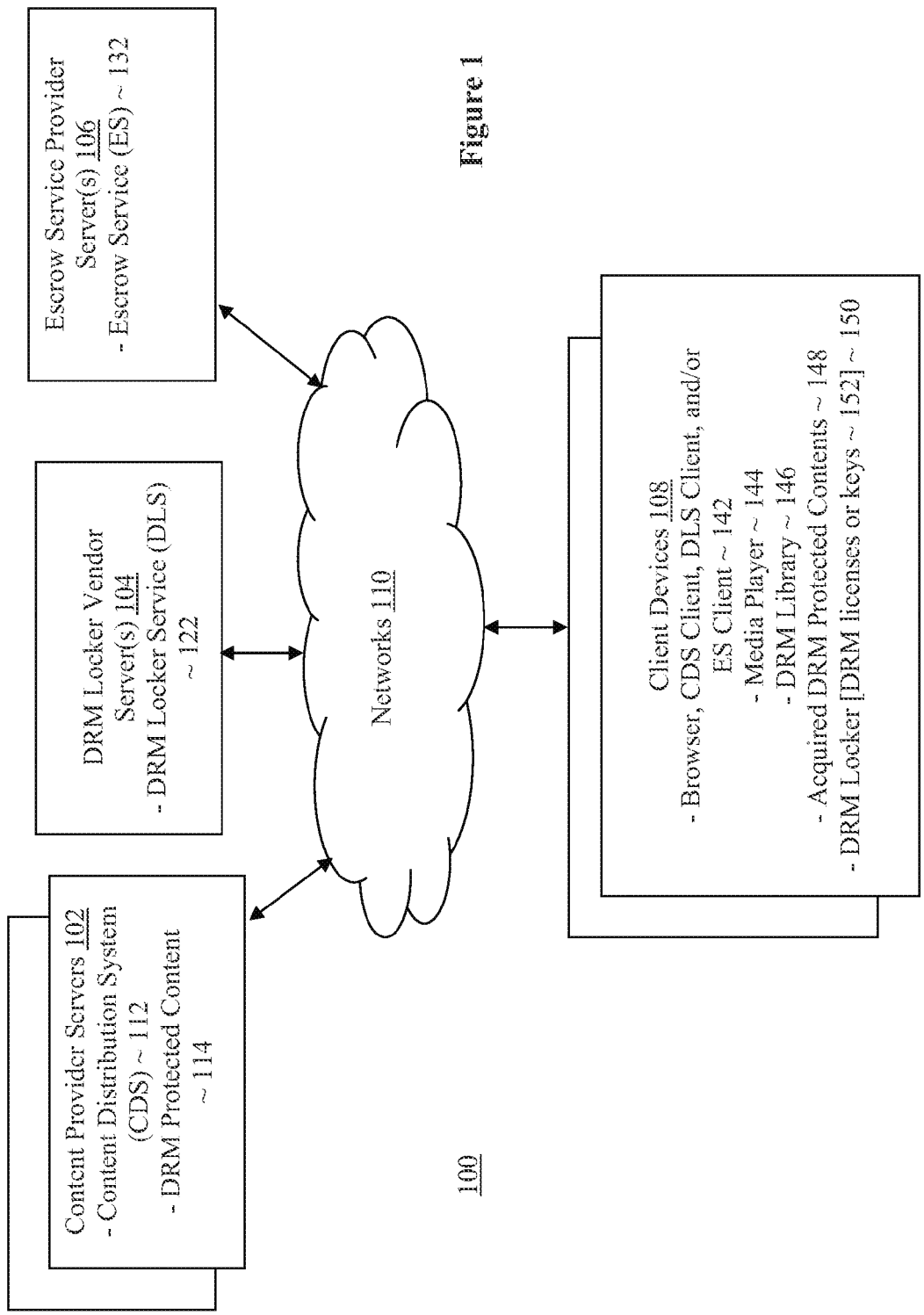
FIG. 1 illustrates an overview of an arrangement associated with digital rights management through usage of DRM lockers provided by a DRM locker vendor.

FIG. 1 illustrates an overview of an arrangement associated with digital rights management through usage of DRM lockers, in accordance with various embodiments. As illustrated, arrangement 100 may include a number of client devices 108 coupled with one or more servers 104 of a DRM locker vendor, via network(s) 110. The DRM locker vendor may be separate and/or independent of the content providers. The DRM locker vendor may, e.g., through server(s) 104 and DRM locker service 122 operated thereon, provide DRM lockers 150 to client devices 108. A user of a client device 108 may use his/her DRM locker 150 to securely store DRM licenses or keys 152 of various DRM protected contents 148 acquired from various content providers, e.g., from servers 102 of the various content providers. The acquired DRM protected contents 148 may be DRM protected audio and/or video contents. Servers 102, may likewise be coupled with server(s) 104 and client devices 108 via network(s) 110. As described earlier, employment of DRM locker 150 may provide a user of a client device 108 with various benefits and/or advantages, including, e.g., but not limited to, the ability to continue to enjoy and consume acquired DRM protected contents 148 even when the DRM license or key servers of the content providers, e.g., servers 102, are no longer accessible or available. These and other related topics will be described in more detail below, with references to FIGS. 2-5.

Still referring to FIG. 1, server(s) 102 of a content provider, as illustrated, may include content distribution system 112 and DRM protected contents 114 of the content provider available for acquisition. As will be described in more detail below, content distribution system 112 may be configured to cooperate to enable DRM licenses or keys 152 employed to protect contents 114 to be stored in DRM lockers 150 of client devices 108, thereby enabling acquired DRM protected contents 148 to be consumed legitimately, without requiring availability or accessibility of the DRM license or key servers of the content providers, e.g., servers 102.

In various embodiments, DRM lockers 150 may be secured, and have corresponding associated locker keys (not shown in FIG. 1, to be described in more detail later). For these embodiments; possession of the associated locker keys may be required in order to be able to access DRM licenses or keys 152 stored in DRM lockers 150. For the illustrated embodiments, arrangement 100 may further include server(s) 106 of one or more escrow service providers, having one or more corresponding escrow services 132 correspondingly operated thereon. Similar to the relationship between the DRM locker vendor and the content providers, an escrow service provider may likewise be separate and/or independent of the DRM locker vendor. Escrow service 132 of a escrow service provider may be employed to escrow the locker keys to facilitate migration of a DRM locker 150 from one of client devices 108 to another one of client devices 108, e.g., in a situation where a user of a client device 108 wants to upgrade and/or replace his/her device. Similar to servers 102 and 104 and client devices 108, server(s) 106 may be coupled with servers 102 and 104 and client devices 108 via network(s) 110.

Each client device 108, in addition to DRM locker 150, may further include a browser, a content distribution system (CDS) client, a DRM locker service (DLS) client and/or an escrow service (ES) client, collectively denoted 142, depending on whether each of content distribution systems 112, DRM locker service 122 and escrow service(s) 132 is configured to be accessed with a browser or a corresponding client. For example, in embodiments, a content distribution system 112, DRM locker service 122 and/or an escrow service 132 may be a web site configured to be accessed with a browser. In other embodiments, a content distribution system 112, DRM locker service 122 and/or an escrow service 132 may be a server application configured to interact with a corresponding client, e.g., "apps" for smartphone client devices.

Further, each client device 108 may include a media player 144 and optionally, a DRM library 146. Each client device 108 may be, but not limited to, a smartphone, a computing tablet, a laptop computer, a desktop computer, a personal digital assistant (PDA), a game player, a media player, a game console, a set-top box, or other devices of the like. Media player 144, and media library 146, when employed, are intended to represent a broad range of these elements known in the art.

Various example embodiments of computing devices suitable for use as servers 102-106 and/or client devices 108 will be described later with references to FIG. 6. Networks 110 are intended to represent a broad range of wired and/or wireless, local and/or wide area, private and/or public networks, e.g., the Internet, known in the art.

Figure 2:
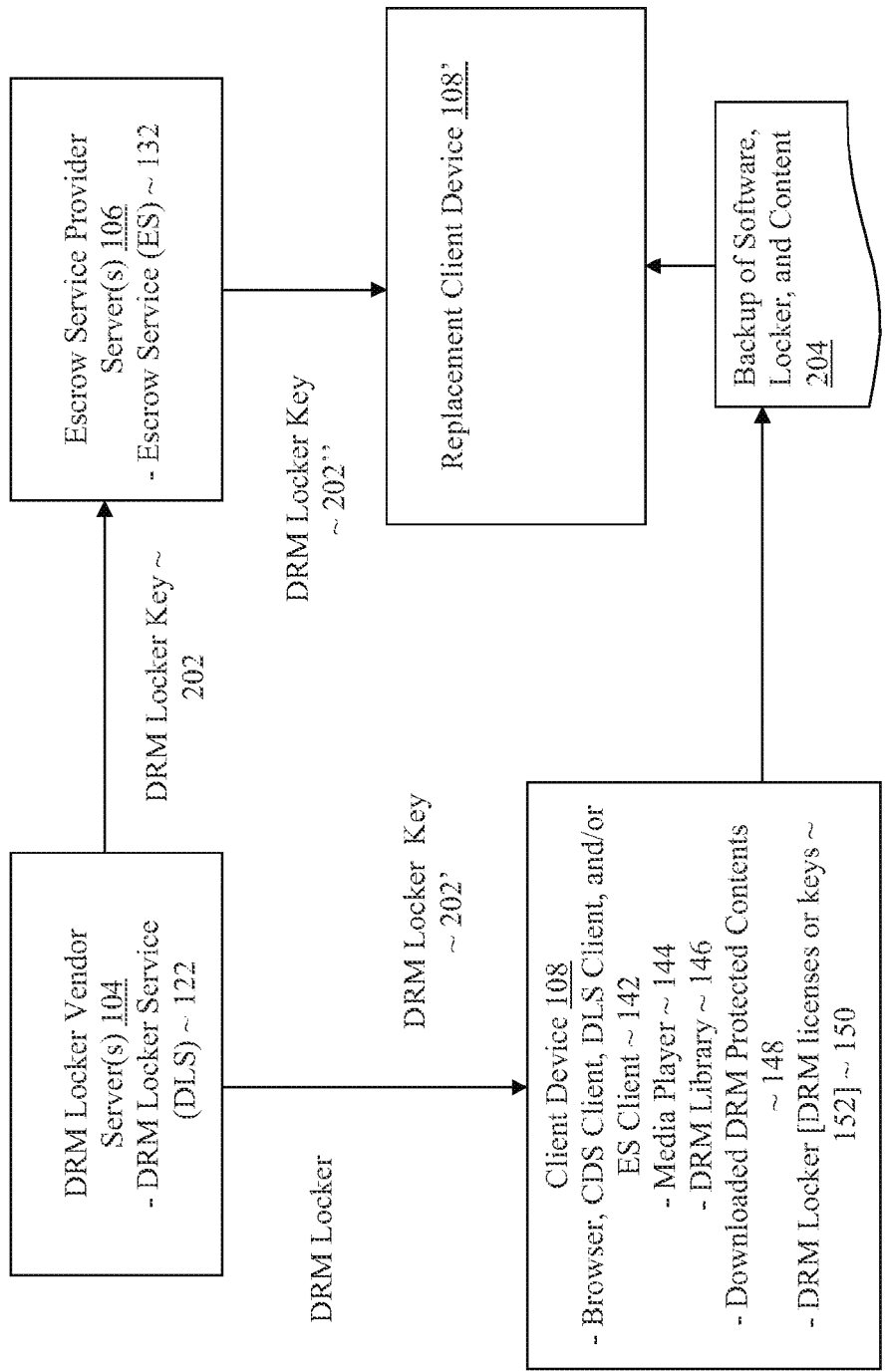
FIG. 2 illustrates an overview of the interactions between the client devices, the server(s) of the DRM locker vendor and optionally, the server(s) of an escrow service provider.

FIG. 2 illustrates an overview of the interactions between the client devices, the server(s) of the DRM locker vendor and optionally, the server(s) of an escrow service provider, in accordance with various embodiments of the present disclosure. As illustrated, a client device 108 may initially interact with DRM locker service 122, using a browser or a DLS client 142, to acquire a DRM locker 150. As described earlier, DRM locker 150 may be secured, and access to its content may be protected by a DRM locker key 202. For the embodiments, DRM locker service 122 may provide a particularized copy of DRM locker key 202' to a client device 108, as part of the initial acquisition, for use to access DRM locker 150 on the particular client device 108. DRM locker key 202' may be particularized to a client device 108, e.g., by incorporating information into DRM locker key 202', that are unique to the particular client device. In various embodiments, the particularization of a DRM locker 202' to a particular client device may be performed by DRM locker service 122 before provided to the client device 108, or by DRM locker 150, e.g., through localization, after provision to the client device 108. In alternate embodiments, other approaches to secure DRM locker 150 may be employed instead. In embodiments, DRM locker service 122 may provide DRM locker key 202' to DRM library 146 or media player 144 of client device 108, depending on implementation preference.

Further, in embodiments, as part of the acquisition process, or shortly thereafter, DRM locker service 122 may provide a master copy of DRM locker key 202 to an escrow service 132 for safe keeping. At a subsequent point in time, when the user of a client device 108 needs to replace the client device 108, the user may load a backup copy 204 of the software and data content of the client device 108 onto the replacement client device 108'. Upon loading the backup copy, the user may, e.g., use a browser or an ES client 142 to contact a corresponding escrow service 132 to obtain a new copy of DRM locker key 202" particularized to the replacement client device 108'. In embodiments, the escrow service 132 may provide the replacement client device 108' with the new DRM locker key 202" after receiving the appropriate licensee account and/or authentication information, as well as information about the replacement client device 108'. As with the initial DRM locker key 202', DRM locker key 202" may be particularized to the replacement client device 108' by the escrow service 132 or by the DRM locker 150 on the replacement client device 108'. In embodiments, the escrow service 132 may limit the number of replacement DRM locker keys 202" that may be issued.

Figure 3:
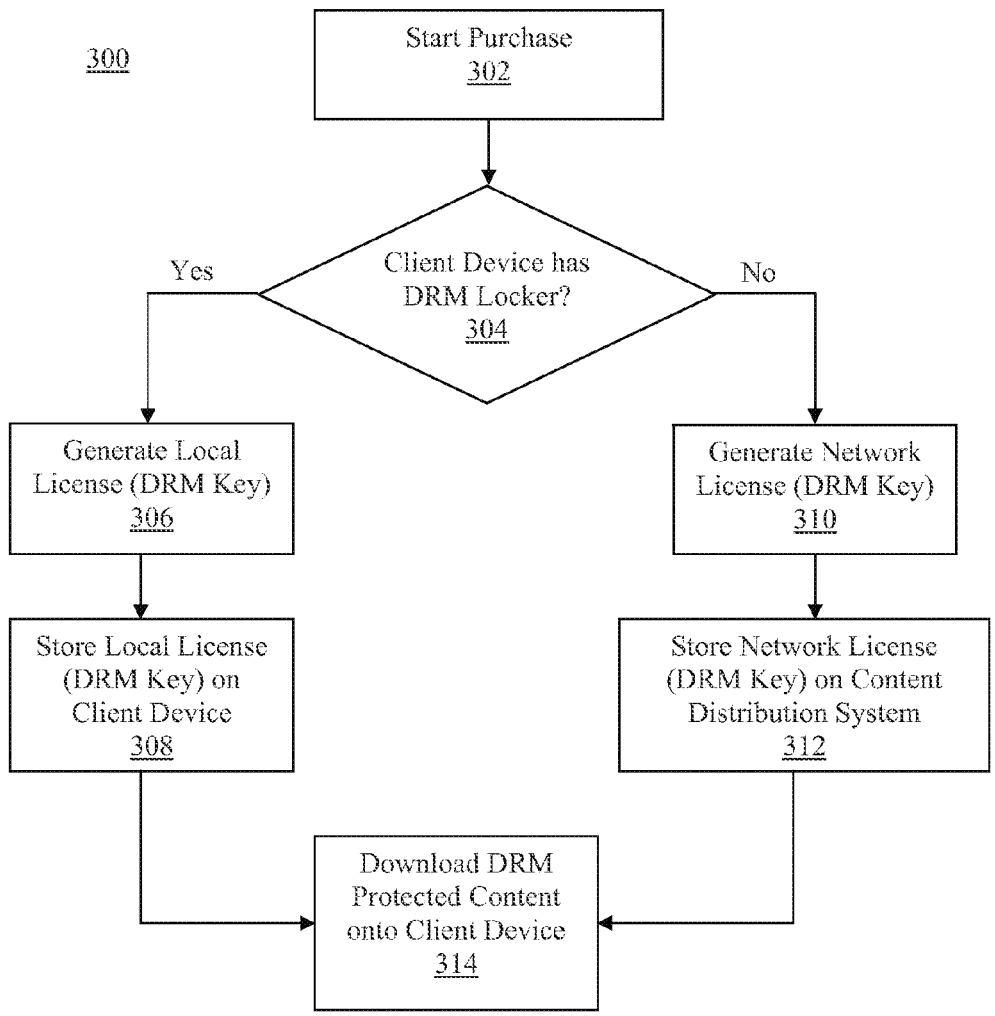
FIG. 3 illustrates an example operational flow of a content distribution system of a content provider.

FIG. 3 illustrates an example operational flow of a content distribution system of a content provider, in accordance with various embodiments of the present disclosure. As shown, operational flow 300 may start at block 302, with the content distribution system 112 receiving a purchase order for a DRM protected content of the content provider from a client device 108. As described earlier, the purchase order may be received from a browser or a CDS client 142 of the client device 108. On receipt of the purchase order, flow 300 may proceed from block 302 to block 304. At block 304, the content distribution system 112 may determine whether the client device 108 has a DRM locker 150.

If it is determined that client device 108 has a DRM locker 150, flow 300 may proceed from block 304 to block 306. At block 306, the content distribution system 112 may generate a DRM license or key for the DRM protected content being purchased, designed for local use by the user of the client device 108. From block 306, flow 300 may proceed to block 308. At block 308, the content distribution system 112 may provide the local DRM license or key to the DRM locker 150 on the client device 108.

On the other hand, if it is determined that the client device 108 does not have a DRM locker 150, flow 300 may proceed from block 304 to block 310 instead. At block 310, the content distribution system 112 may generate a DRM license or key for the DRM protected content being purchased, designed for network use by the user of the client device 108. That is, the client device 108 has to contact the content distribution system 112 when the user desires to consume the DRM protected content. From block 310, flow 300 may proceed to block 312. At block 312, the content distribution system 112 may store the network DRM license or key for future use by the client device 108.

Either case, from block 306 or 312, flow 300 may proceed to block 314. At block 314, the content distribution system 112 may download the DRM protected content 114 to the client device 108, and store as acquired DRM protected content 148 on the client device 108.

Figure 4:
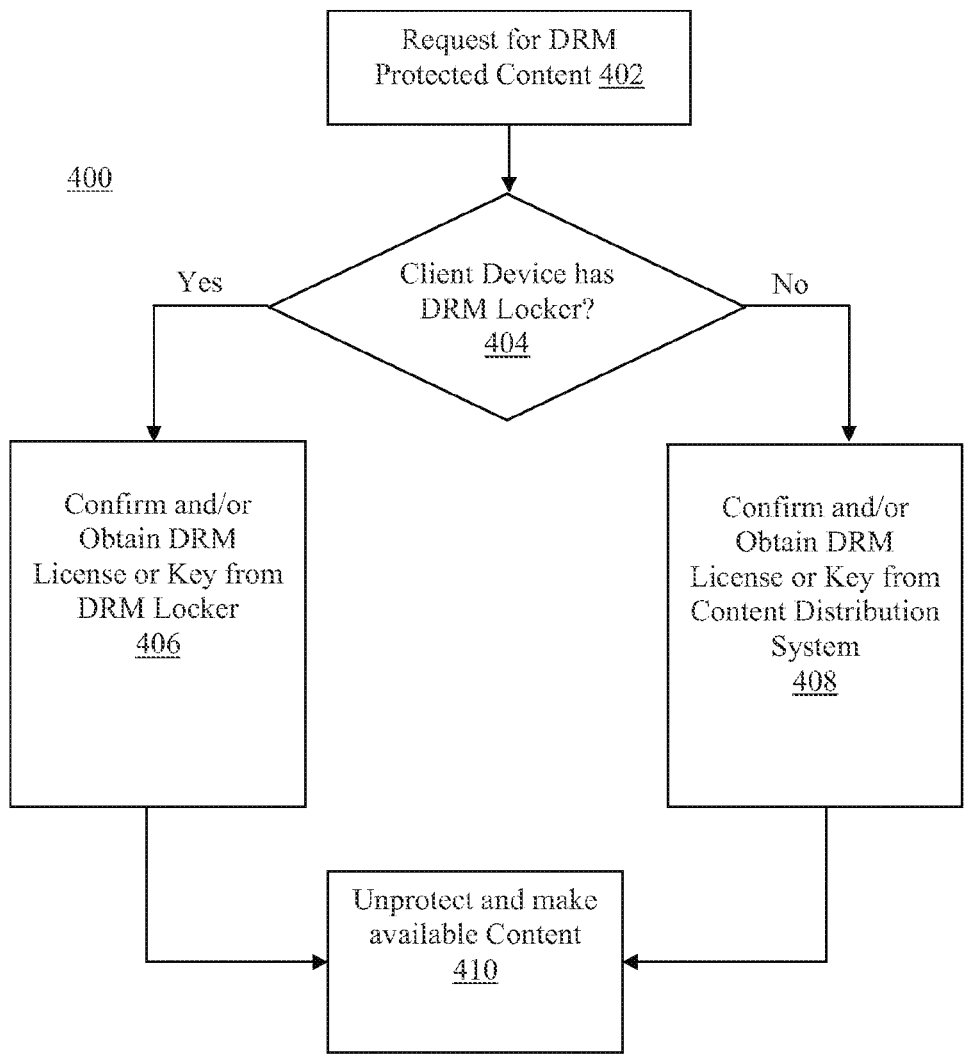
FIG. 4 illustrates an example operation flow of a DRM library on a client device.

FIG. 4 illustrates an example operation flow of a DRM library on a client device, in accordance with various embodiments of the present disclosure. As illustrated, operational flow 400 may start at block 402. At block 402, DRM library 146 on a client device may receive a request for DRM protected content. For example, DRM library 146 may receive such a request from media player 144. Media player 144 may make the request in response to a user's request to play the DRM protected content.

From block 402, flow 400 may proceed to block 404. At block 404, DRM library 146 may determine whether the client device 108 has a DRM locker 150. On determining that the client device 108 has a DRM locker 150, flow 400 may proceed from block 404 to block 406. At block 406, DRM library 146 may confirm and/or obtain the local DRM license or key 152 from DRM locker 150. On the other hand, if it is determined that the client device 108 does not have a DRM locker 150, flow 400 may proceed from block 404 to block 408. At block 408, DRM library 146 may confirm and/or obtain the network DRM license or key from content distribution system 112. In embodiments, DRM library 146 may first determine whether the client device 108 is connected to network(s) 110. If client device 108 is not connected to network(s) 110, DRM library 146 may respond to the request with an error, indicating, e.g., requested content not available.

Either case, from block 406 or 408, flow 400 may proceed to block 410. At block 410, DRM library 146 may unprotect, e.g., decrypt, the content, and respond to the request with the unprotected content.

As alluded to earlier, in alternate embodiments, flow 400 may be integrated with and performed by media player 144.

Figure 5:
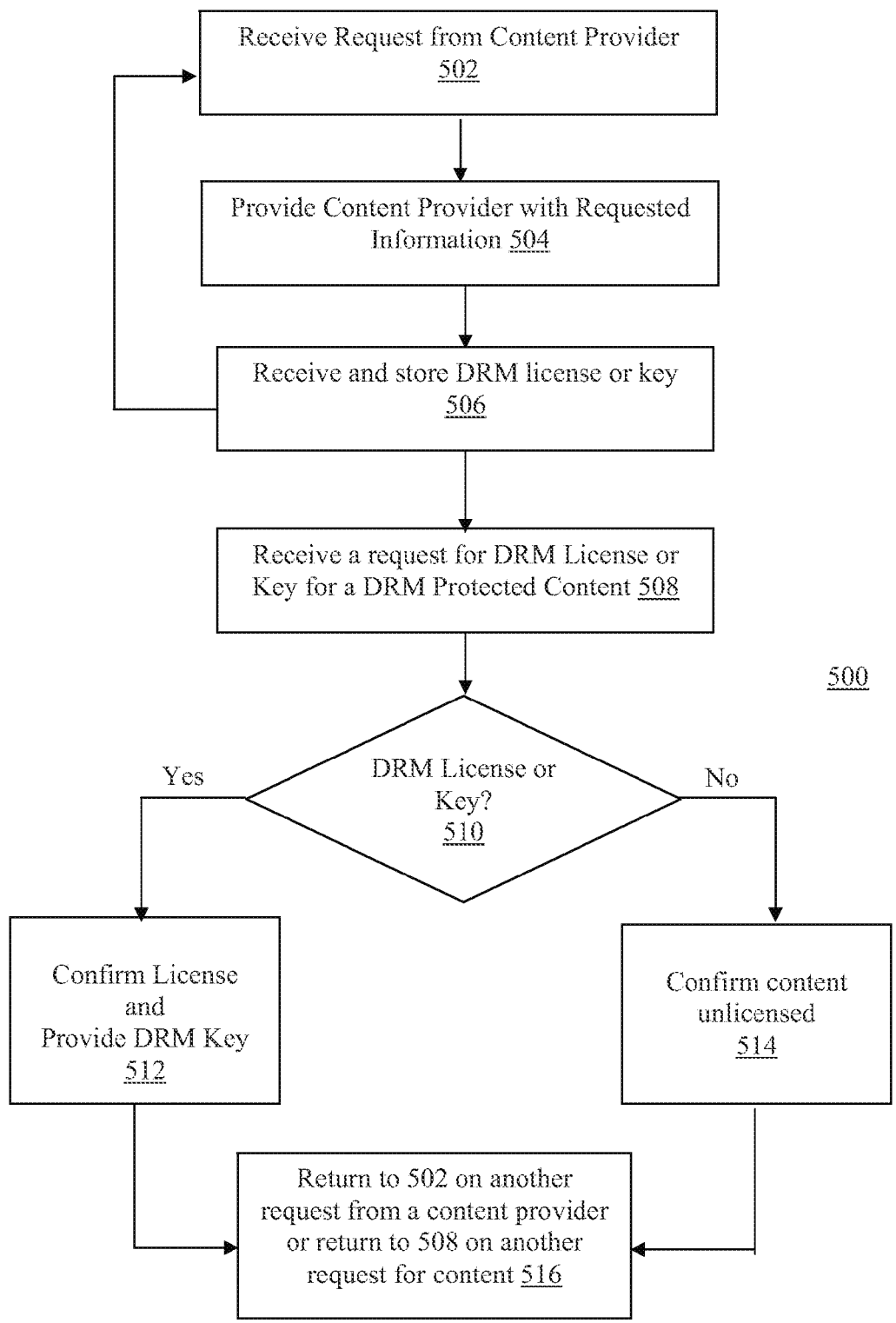
FIG. 5 illustrates an example operation flow of a DRM locker on a client device.

FIG. 5 illustrates an example operation flow of the DRM locker on a client device; in accordance with various embodiments of the present disclosure. As illustrated, operational flow 500 may start at block 502. At block 502, e.g., during the purchase of a DRM protected content, DRM locker 150 on a client device may receive a request from a content distribution system 112 to confirm the existence of DRM locker 150, and in response, provide the requisite identification and/or authentication information of the client device 108 and/or the user. From block 502, flow 500 may proceed to block 504. At block 504, DRM locker 150 may provide the requested identification and/or authentication information to content distribution system 112. In embodiments, DRM locker 150 may provide the requested identification and/or authentication information, after content distribution system 112 has identified and/or authenticated itself.

From block 504, flow 500 may proceed to block 506. At block 506, DRM locker 150 may receive one or more DRM licenses or keys for one or more DRM protected contents from content distribution system 112, and store the received DRM licenses or keys. From block 504, flow 500 may return to block 502, where the flow may be repeated again with content distribution system 112 of the same content provider or different content providers. The different content providers may be interacted using browser or different CDS clients 142. Accordingly, as described earlier, DRM locker 150 may store DRM licenses or keys 152 of different types, for different DRM protected contents from the same or different content providers.

At block 506, flow 500 may proceed to block 508 instead. At block 508, DRM locker 150 may receive a request for DRM license or key for a DRM protected content. For example, DRM locker 150 may receive the request from DRM library 146. From block 508, flow 500 may proceed to block 510. At block 510, DRM locker 150 may determine whether it has the DRM license or key for the DRM protected content of interest. If it is determined that DRM locker 150 has the DRM license or key for the DRM protected content of interest, flow 500 may proceed to block 512. At block 512, DRM locker 150 may confirm and/or retrieve and return the DRM license or key, so it can be used to unprotect the content, and enable the unprotected content to be available. On the other hand, if it is determined that DRM locker 150 does not have the DRM license or key for the DRM protected content of interest, flow 500 may proceed to block 514. At block 514, DRM locker 150 may return an error, indicating, e.g., the DRM protected content is not available.

Either case, from block 512 or 514, flow 500 may proceed to block 516. At block 516, flow 500 may transition to block 502 on another request from a content distribution system 112, or to block 508 on another request for DRM license or key.

Figure 6:
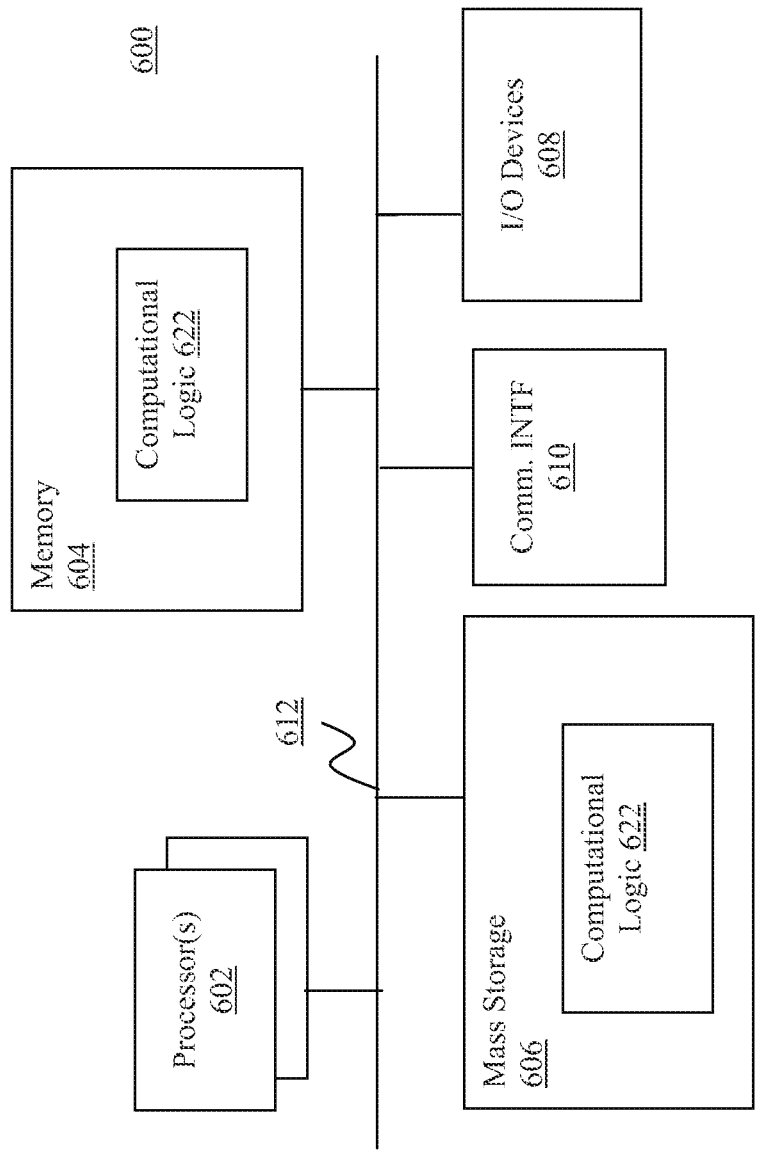
FIG. 6 illustrates an example computer system suitable for use as a client device or a server.

FIG. 6 illustrates an example computer system suitable for use as a client device or a server, in accordance with various embodiments of the present disclosure. As shown, computer 600 may include a number of processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control and so forth) and communication interfaces 610 (such as network interface cards, modems and so forth). The elements may be coupled to each other via system bus 612, which may represent one or more buses. In the case of multiple buses, they may be bridged by one or more bus bridges (not shown).

The elements included, and their capacity or performance characteristics may vary depending on whether example computer system 600 is employed as one of servers 102-106 or one of client devices 108.

Each of the elements may perform its conventional functions known in the art. In particular, system memory 604 and mass storage 606 may be employed to store a working copy and a permanent copy of the programming instructions implementing the various ones of the elements, such as content distribution system 112, DRM locker service 122, escrow service 132, media player 144, DRM library 146, DRM locker 150 (or portion thereof), and so forth. These elements may be implemented in assembler instructions supported by processor(s) 602 or high-level languages, such as, for example, C, that can be compiled into such instructions.

The permanent copy of the programming instructions may be placed into mass storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The constitution of elements 602-612 are known, and accordingly will not be further described.

FIG. 7 illustrates an example non-transitory computer-readable storage medium having instructions configured to practice all or selected aspects of the methods of FIG. 2-5; in accordance with various embodiments of the present disclosure. As illustrated, non-transitory computer-readable storage medium 702 may include a number of programming instructions 704. Programming instructions 704 may be configured to enable a device, e.g., computer 600, in response to execution of the programming instructions, to perform various operations of the various flows of FIG. 2-5. In alternate embodiments, programming instructions 704 may be disposed on multiple non-transitory computer-readable storage media 702 instead.

Referring back to FIG. 6, for one embodiment, at least one of processors 602 may be packaged together with computational logic 622 configured to practice aspects of one of the flows of FIGS. 2-5. For one embodiment, at least one of processors 602 may be packaged together with computational logic 622 configured to practice one or more aspects of one of the flows of FIGS. 2-5 to form a System in Package (SiP). For one embodiment, at least one of processors 602 may be integrated on the same die with computational logic 622 configured to practice aspects of one of the flows of FIGS. 2-5. For one embodiment, at least one of processors 602 may be packaged together with computational logic 622 configured to practice aspects of one of the flows of FIGS. 2-5 to form a System on Chip (SoC). For at least one embodiment, the SoC may be utilized in, e.g., but not limited to, a computing tablet.

Thus, at least one non-transitory computer-readable storage medium may have a plurality of instructions configured to enable a computing device, in response to execution of the instructions by the computing device, to implement a DRM locker on the computing device. The DRM locker may be configured to receive and store a first DRM license or key of a first DRM protected content of a first content provider in the DRM locker; and receive and store a second DRM license or key of a second DRM protected content of a second content provider in the DRM locker. Further, on presentation of an associated locker key, the DRM locker may respond to a request for the first or second DRM license or key with the corresponding first or second DRM license or key, to enable consumption of the corresponding first or second DRM protected content using the computing device.

In embodiments, receive and store of the first and second DRM licenses may include receive and store the first and second DRM licenses that are of different DRM license types. In embodiments, receive and store of the first and second DRM keys may include receive and store the and second DRM keys that are of different DRM key types. In embodiments, receive and store of the first and second DRM licenses or keys may include receive and store the first and second DRM licenses or keys of the first and second DRM protected content that are audio or video content. In embodiments, receive and store of the first and second DRM licenses or keys may include receive and store the first and second DRM licenses or keys from the first and second content providers that are different content providers. In embodiments, respond to a request for the first or second DRM license or key may include respond to a request for the first or second DRM license or key by a DRM library or a media player of the computing device.

In embodiments, the instructions may be first instructions, and the at least one computer-readable storage medium may further include second instructions, in response to execution by the computing device, enable the computing device to provide information about the computing device to a DRM locker vendor to obtain the first instructions from the DRM locker vendor. In embodiments, the instructions may be first instructions, and the at least one computer-readable storage medium may further include second instructions, in response to execution by the computing device, enable the computing device to provide information about the DRM locker or the computing device to a content distribution system of the first content provider.

In embodiments, the computing device may be a selected one of a smartphone, a computing tablet, a laptop computer, a desktop computer, a PDA, a game player, a media player, a game console, or a set-top box.

Additionally, at least one non-transitory computer-readable storage medium having a plurality of instructions configured to provide to a computing device, in response to execution of the instructions by the computing device, to implement a DRM locker vendor service. The DRM locker vendor service may be configured to provide a DRM locker and an associated locker key to a client device. The DRM locker may be configured to receive and store DRM licenses or keys for a plurality of DRM protected contents of a plurality of content providers. On presentation of the associated locker key, the DRM locker may respond to a request for a first DRM license or key with the first DRM license or key, to enable consumption of a corresponding first DRM protected content using the client device.

In embodiments, the DRM licenses or keys may include DRM licenses or keys of a plurality of DRM license or key types. In embodiments, the DRM locker vendor service may be further configured to provide the associated locker key to an escrow service to escrow the associated locker key. In embodiments, the computing device and the client device may be remotely disposed from each other, and the DRM locker vendor service may be configured to provide the DRM locker and the associated locker key to the client device via one or more networks coupling the computing device and the client device.

Further, a method may include receiving, by a computing device of an escrow service, from a DRM locker vendor service, a locker key associated with a DRM locker provided by the DRM locker vendor service to a first client device; and on presentation of required information, providing by the computing device, the locker key to a second client device, different from the first client device, to enable the DRM locker to be moved and used on the second client device. The DRM locker may be configured to receive and store DRM licenses or keys of a plurality of DRM license or key types for a plurality of DRM protected contents of a plurality of content providers, on a selected one of the first or second client device where the DRM locker is installed, to enable consumption of the DRM protected contents using the selected one of first or second client device.

In embodiments, the method may further includes receiving the required information, by the computing device, from the second client device. In embodiments, the required information may include information about a licensee of the DRM locker.

Still further, an apparatus may include one or more servers; and a content distribution system operated by the one or more servers. The content distribution system may be configured to receive, from a client device, a purchase order for a DRM protected content; determine whether the client device has a DRM locker; and on determination that the client device has a DM locker, generate a local DRM license or key for the DRM protected content, and provide the local DRM license or key to the client device for storage in the DRM locker, and facilitate by the DRM locker consumption of the DRM protected content using the client device.

In embodiments, the content distribution system may be further configured to provide the DRM protected content to the client device. In embodiments, the content distribution system may be further configured to, on determination that the client device does not have a DRM locker, generate a network DRM license or key for the DRM protected content, store the network DRM license or key in storage accessible to the content distribution system, and facilitate consumption of the DRM protected content using the client device using the network DRM license or key.

In embodiments, the DRM locker may be configured to store a plurality of local DRM licenses or keys of a plurality of DRM license or key types for a plurality of DRM protected contents of a plurality of content providers.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims.

What is claimed is:

1. An apparatus, comprising:
a digital rights management (DRM) locker to manage DRM licenses or keys for DRM protected contents downloaded onto the apparatus from different content providers;
wherein the DRM locker is transmitted from a server of a DRM locker vendor, has an associated locker key, and is configured to:
receive and store a first DRM license or key of a first DRM protected content downloaded onto the apparatus from a first content provider, in the DRM locker, wherein the first DRM license or key is sent by the first content provider on confirmation of the presence of the DRM locker to the first content provider, by the apparatus;
receive and store a second DRM license or key of a second DRM protected content downloaded onto the apparatus from a second content provider, in the DRM locker, wherein the second DRM license or key is sent by the second content provider on confirmation of the presence of the DRM locker to the second content provider, by the apparatus, wherein the first and second content providers are different content providers; and
on presentation of the associated locker key by a DRM library or media player of the apparatus, respond to a request of the corresponding DRM library or media player for the first or second DRM license or key, with the corresponding first or second DRM license or key, to enable consumption of the corresponding downloaded first or second DRM protected content, using the apparatus.

2. The apparatus of claim 1, wherein the first and second DRM licenses are of different DRM license types.

3. The apparatus of claim 1, wherein the first and second DRM keys are of different DRM key types.

4. The apparatus of claim 1, wherein the first and second DRM protected content are audio or video content.

5. The apparatus of claim 1, wherein the apparatus is configured to provide information about the apparatus to the DRM locker vendor to obtain the DRM locker, and the associated locker key of the DRM locker from the DRM locker vendor, wherein the associated locker key of the DRM locker is particularized to the apparatus, based at least in part on some of the information about the apparatus provided.

6. The apparatus claim 1, wherein the apparatus is further configured to provide information about the DRM locker and the apparatus to a content distribution system of the first content provider to confirm to the first content provider, presence of the DRM locker on the apparatus.

7. The apparatus of claim 1, wherein the apparatus is a selected one of a smartphone, a computing tablet, a laptop computer, a desktop computer, a personal digital assistant (PDA), a game player, a media player, a game console, or a set-top box.

8. An apparatus, comprising:
one or more processors; and
an escrow service to be operated by the one or more processors to:
receive, from a digital rights management (DRM) locker vendor service, differ from the escrow service, a locker key associated with a DRM locker provided by the DRM locker vendor service to a first client device; and on presentation of required information, provide the locker key to a second client device, different from the first client device, to enable the DRM locker to be moved and used usable on the second client device, after the DRM locker has been moved from the first client device to the second client device;

wherein the DRM locker is configured to receive and store DRM licenses or keys of a plurality of DRM license or key types for a plurality of DRM protected contents of a plurality of different content providers, downloaded onto a selected one of the first or second client device where the DRM locker is installed, to enable consumption of the downloaded DRM protected contents, using the selected one of first or second client device, wherein the DRM licenses or keys are sent by the different content providers on confirmation of the presence of the DRM locker to the content providers, by the selected one of the first or second client device.

9. The apparatus of claim 8, wherein the escrow service to further receive the required information from the second client device.

10. The apparatus of claim 8, wherein the required information comprises information about a licensee of the DRM locker.

11. At least one non-transitory computer-readable storage medium having a plurality of instructions configured to provide to a computing device, in response to execution of the instructions by the computing device, a content distribution system configured to:

receive, from a client device, a purchase order for a digital rights management (DRM) protected content;

determine whether the client device has a DRM locker provided to the client device by a DRM locker vendor, and the DRM locker is secured with an associated locker key; and on determination that the client device has a DRM locker provided by the DRM locker vendor, and the DRM locker is secured with an associated locker key, generate a local DRM license or key for the DRM protected content, enabling the DRM protected content to be downloaded and consumed onto the client device, and provide the local DRM license or key to the client device for storage in the DRM locker, and for facilitation facilitate by the DRM locker, consumption of the downloaded DRM protected content, using the client device.

12. The storage medium of claim 11, wherein the content distribution system is further configured to, on determination that the client device does not have a DRM locker, generate a network DRM license or key for the DRM protected content, store the network DRM license or key in storage accessible to the content distribution system, and facilitate consumption of the DRM protected content using the client device, using the network DRM license or key.

13. The storage medium of claim 11, wherein the DRM locker is configured to store a plurality of local DRM licenses or keys of a plurality of DRM license or key types for a plurality of DRM protected contents of a plurality of content providers.

* * * * *